United States Patent
Hagiya et al.

(10) Patent No.: US 10,797,565 B2
(45) Date of Patent: Oct. 6, 2020

(54) MOTOR WITH INNER FAN

(71) Applicant: Hitachi Industrial Products, Ltd., Chiyoda-ku, Tokyo (JP)

(72) Inventors: Isao Hagiya, Tokyo (JP); Misato Sato, Tokyo (JP); Takayuki Koyama, Tokyo (JP); Kenichi Sugimoto, Tokyo (JP)

(73) Assignee: Hitachi Industrial Products, Ltd., Tokyo (JP)

( * ) Notice: Subject to any disclaimer, the term of this patent is extended or adjusted under 35 U.S.C. 154(b) by 0 days.

(21) Appl. No.: 16/283,014

(22) Filed: Feb. 22, 2019

(65) Prior Publication Data

US 2020/0007008 A1    Jan. 2, 2020

(30) Foreign Application Priority Data

Jun. 29, 2018  (JP) .................. 2018-124054

(51) Int. Cl.
  *H02K 9/06* (2006.01)
  *F04D 29/58* (2006.01)
  *F04D 25/08* (2006.01)
  *F04D 25/06* (2006.01)

(52) U.S. Cl.
  CPC ........... *H02K 9/06* (2013.01); *F04D 25/0606* (2013.01); *F04D 25/082* (2013.01); *F04D 29/5806* (2013.01)

(58) Field of Classification Search
  CPC ............... H02K 9/06; H02K 3/18; H02K 5/20
  USPC ................. 310/52, 57, 58, 59, 60 R
  See application file for complete search history.

(56) References Cited

U.S. PATENT DOCUMENTS

| 4,845,394 | A | * | 7/1989 | Kleinhans | H02K 9/18 310/64 |
| 2008/0018183 | A1 | * | 1/2008 | Kinoshita | H02K 9/06 310/63 |
| 2008/0030086 | A1 | * | 2/2008 | Noda | B61C 9/50 310/57 |

FOREIGN PATENT DOCUMENTS

| JP | 11-4559 A | 1/1999 |
| JP | 2004-236439 A | 8/2004 |

* cited by examiner

*Primary Examiner* — Jose A Gonzalez Quinones
(74) *Attorney, Agent, or Firm* — Crowell & Moring LLP

(57) ABSTRACT

A motor with an inner fan includes a rotor rotating with a shaft, a stator opposing the outer peripheral surface of the rotor, an end ring connected to the rotor, stator wiring connected to the stator, a fan rotating with the shaft through a sleeve, a fan guide opposing the tip end of the blade outer periphery of the fan, and a frame storing the rotor, the stator, the fan, the fan guide, the end ring, and the stator wiring. The rotor includes an axial duct penetrating the rotor in the axial direction of the rotor and a radial duct communicating with the axial duct and penetrating the rotor radially from the inside to the outside of the rotor. The fan is an inner fan arranged inside the frame, the inner fan is of a diagonal flow type, and the discharge direction of the inner fan is the inward direction.

5 Claims, 4 Drawing Sheets

MOTOR WITH INNER FAN

CLAIM OF PRIORITY

The present application claims priority from Japanese Patent application serial no. 2018-124054, filed on Jun. 29, 2018, the content of which is hereby incorporated by reference into this application.

BACKGROUND OF THE INVENTION

1. Field of the Invention

The present invention relates to a motor with an inner fan.

2. Description of the Related Art

As a background art of the present technical field, there is JP-A No. 2004-236439. In the gazette, there is described a rotating electric machine in which a hollowed rotor core is held to a rotor shaft by a rotor shaft arm, and an axial duct is thereby formed between the rotor core and the rotor shaft.

Also, as a background art of the present technical field, there is JP-A No. Hei 11-4559. In the gazette, there is described a motor with a cooling fan that includes a motor body, a cooling fan, and a duct, plural cooling through holes being formed in a rotor core in the motor body, a cooling gas flowing through the cooling through holes, the cooling fan being arranged on an end side of the opposite side of an end of the motor body where an output shaft protrudes and applying pressure to the cooling gas that flows though the plural cooling through holes, the duct forming a gas circulation passage that connects the plural cooling through holes and an air passage of the cooling fan.

SUMMARY OF INVENTION

A rotating electric machine formed with an axial duct is described in JP-A No. 2004-236439 and a motor with a cooling fan is described in JP-A No. Hei 11-4559 respectively. However, in the rotating electric machine or the motor described in JP-A No. 2004-236439 and JP-A No. Hei 11-4559, when the motor (rotating electric machine) has a higher output or a higher density, there is a possibility that a heat generation amount generated in a rotor and a stator exceeds the cooling capacity of the motor and the temperature rise of the rotor and the stator exceeds a rated value.

Therefore, the present invention provides a motor with an inner fan which can efficiently cool a rotor and a stator without increasing the size of the motor and without increasing the noise even when the motor has a higher output and a higher density.

In order to solve the problem described above, a motor with an inner fan of the present invention includes a rotor that rotates with a shaft, a stator that opposes the outer peripheral surface of the rotor, an end ring that is connected to the rotor, stator wiring that is connected to the stator, a fan that rotates with the shaft through a sleeve, a fan guide that opposes the tip end of the blade outer periphery of the fan, and a frame that stores the rotor, the stator, the fan, the fan guide, the end ring, and the stator wiring, in which the rotor includes an axial duct and a radial duct, the axial duct penetrating the rotor in the axial direction of the rotor, the radial duct communicating with the axial duct and penetrating the rotor radially from the inside to the outside of the rotor, the fan is an inner fan that is arranged inside the frame, the inner fan is of a diagonal flow type (a mixed flow type), and the discharge direction of the inner fan is the inward direction.

According to the present invention, such motor with an inner fan can be provided that can efficiently cool a rotor and a stator without increasing the size of the motor and without increasing the noise even when the motor has a higher output and a higher density.

Also, problems, configurations and effects other than those described above will be clarified by explanation of embodiments below.

DESCRIPTION OF PREFERRED EMBODIMENTS

Below, embodiments will be explained using the drawings.

First Embodiment

Figure 1:
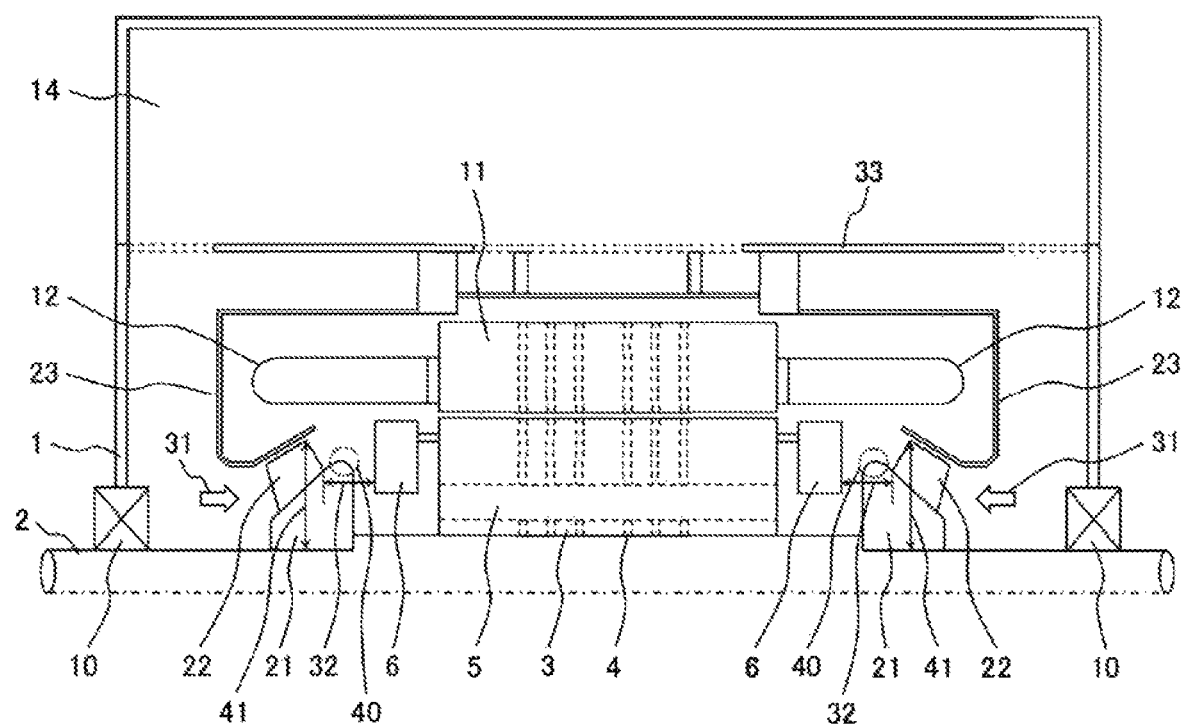
FIG. 1 is a schematic view that shows a cross section of an essential part of a motor with an inner fan related to the present embodiment.

FIG. 1 is a schematic view that shows a cross section of an essential part of a motor with an inner fan related with the present embodiment.

Also, a motor 100 described in the present embodiment is a motor such as an industrial induction motor (rotational speed of 60 Hz for example) of the MW (megawatt) class having a comparatively large capacity.

The motor 100 is configured of a shaft 2, a rotor 3 that is supported by the shaft 2 and rotates with the shaft 2, a stator 11 that is positioned so as to oppose the outer peripheral surface of the rotor 3, a magnetic force being generated in the stator 11 by rotation of the rotor 3, and a frame 1 that stores them.

The shaft 2 is arranged in the frame 1 so as to be rotatable through bearings 10. The rotor 3 is fixed to a portion between the two bearings 10, and rotates integrally with the shaft 2 around the axis of the shaft 2.

Also, two end rings 6 are connected to both ends of the rotor 3, and two sets of stator wiring 12 are connected to both ends of the stator 11. Further, inner fans 22 are arranged in the shaft 2, the inner fans 22 being supported by the shaft 2 through sleeves 21 and rotating with the shaft 2. Also, fan guides 23 are arranged at the tip end of the blade outer periphery of the inner fans 22 so as to oppose the inner fans 22.

That is to say, the inner fans 22 are fixed respectively to the shaft 2 at the portions of both sides between the bearings 10 and the rotor 3 through the sleeves 21, and are rotated integrally with the shaft 2. Here, the inner fan 22 and the sleeve 21 are of a diagonal flow type. Also, the inner fan 22 is a fan arranged between the two bearings 10 namely inside the frame 1.

The fan guides 23 are arranged so as to oppose the tip ends of the blade outer periphery of the inner fans 22, and are arranged so as to separate the intake side and the discharge side of the inner fans 22.

Thus, the fan guide 23 opposes the outer peripheral surface of the inner fan 22 through a gap. Also, the fan guides 23 are fixed to a ceiling plate 33 that is arranged inside the frame 1.

The frame 1 stores the rotor 3, the stator 11, the inner fans 22, the fan guides 23, the end rings 6, and the stator wiring 12.

Also, a cooler box 14 is arranged on the upper side of the frame 1. Many cooling pipes which are not illustrated and are long in the horizontal direction are arranged inside the cooler box 14.

Axial ducts 5 and radial ducts 4 are arranged in the rotor 3, the axial ducts 5 penetrating the rotor 3 in the axial direction of the rotor 3, the radial ducts 4 communicating with the axial ducts 5 and penetrating the rotor 3 radially from the inside to the outside of the rotor 3.

Thus, the plural radial ducts 4 and the plural axial ducts 5 are arranged in the rotor 3, the plural radial ducts 4 extending radially from the inside diameter to the outside diameter of the rotor 3, the plural axial ducts 5 extending along the axial direction of the shaft 2 and being arranged at intervals in the peripheral direction in a portion on the inside diameter side of the rotor 3.

The inner surface of the stator 11 of a cylindrical shape opposes the outer peripheral surface of the rotor 3 through a gap. In the stator 11 also, the plural radial ducts 4 extending radially from the inside diameter to the outside diameter of the stator 11 are arranged. Also, the stator 11 is fixed to the ceiling plate 33 that is arranged inside the frame 1.

The inner fans 22 are arranged inside the frame 1. Also, this inner fan 22 is of a diagonal flow type. Further, the discharge direction of this inner fan 22 is the inward direction namely the direction where the rotor 3 and the stator 11 are arranged (a flow direction 31 of the cooling air).

Also, the inner fan 22 is arranged on one side or both sides of the vicinity of the rotor 3 so that the discharge direction comes to the rotor 3 side.

Further, with respect to the sleeve 21 that is interposed between the inner fan 22 and the shaft 2, a turning surface 40 is formed on the outer peripheral surface of the sleeve 21 so that the end of the outer peripheral surface on the downstream side of the inner fan 22 turns to the inside diameter direction.

Thereby, at the outlet of the inner fan 22, a part of the flow of the cooling air discharged to the diagonal outside diameter direction can be turned to the inside diameter direction, flowing-in of the cooling air to the axial ducts 5 and the radial ducts 4 of the rotor 3 can be promoted, drop of the air volume of the cooling air to the axial ducts 5 and the radial ducts 4 of the rotor 3 can be suppressed, and the cooling capacity can be increased.

Also, interference of the flow of the cooling air discharged from the inner fan 22 and the end ring 6 that becomes an obstacle for the cooling air can be efficiently suppressed, and the cooling capacity can be increased.

Unlike the outside of the frame 2, in the inside of the frame 2, the rotor 3 and the stator 11 are arranged densely, and a spatial room for arranging a fan is small. Therefore, there has been a problem that, when the size of the fan becomes too large, the fan interferes with the peripheral structures, and sufficient cooling capacity cannot be secured. However, by using the inner fan 22 and the sleeve 21 described in the present embodiment, cooling air can be efficiently supplied to the rotor 3, the stator 11, and the stator wiring 12, and therefore the cooling capacity can be increased.

Also, when an inner fan is used, the cooling air is normally circulated from the inside to the outside of the fan in order to evenly cool the rotor 3 and the stator 11. However, in the motor 100 described in the present embodiment, by using the inner fan 22 of a diagonal flow type and making the flow direction 31 of the cooling air from the outside to the inside of the inner fan 22, the cooling air can be supplied directly to the rotor 3, the stator 11, and the stator wiring 12, and therefore local cooling capacity can be increased. Also, by making the flow direction 31 of the cooling air same to the suction direction of the axial ducts 5, the cooling air can be used efficiently without impairing a pressure rising effect of the radial ducts 4.

The motor 100 is driven by that, when electric power is applied, the rotor 3 supported by the shaft 2 rotates at a high speed by a magnetic force generated in the stator 11.

At this time, the temperature of the rotor 3 and the stator 11 rises by heat loss. The motor 100 includes a heat radiation unit such as the axial ducts 5, the radial ducts 4, and the inner fans 22 in order to keep the upper limit of the temperature rise by this heat loss at a rated value.

For example, the inner fan 22 that generates cooling air (forced convection) in the inside of the frame 1 is provided so as to be supported by the shaft 2, and the cooling air is ventilated to the gap between the rotor 3 and the stator 11, as well as the rotor 3 and the stator 11.

In order to improve the cooling capacity, the radial ducts 4 are arranged in the rotor 3 and the stator 11, the cooling air is ventilated radially from the inside to the outside of the rotor 3, the cooling air is ventilated radially from the inside to the outside of the stator 11, and the rotor 3 and the stator 11 are cooled.

That is to say, the radial ducts 4 described in the present embodiment mean plural air passages that pass through the rotor 3 and the stator 11 and extend radially from the inside diameter side to the outside diameter side of the rotor 3 and radially from the inside diameter side to the outside diameter side of the stator 11.

Also, when the shape of the fan is roughly classified, there are a centrifugal fan, an axial flow fan, and a diagonal flow fan. The shapes of the fan have an advantage and a disadvantage respectively. Generally, the axial flow fan has a large air volume and a low pressure, the centrifugal fan has a small air volume and a high pressure, and the diagonal flow fan has a characteristic between that of the axial flow fan and the centrifugal fan. Also, generally, the structure of the axial flow fan is simple compared to the centrifugal fan, and the structure of the diagonal flow fan is between that of the axial flow fan and the centrifugal fan.

In the motor 100 described in the present embodiment, a diagonal flow fan is used. Particularly, this diagonal flow fan is not used as an outer fan that is arranged outside the frame 1, but is used as an inner fan that is arranged inside the frame 1. The outer fan is normally used for heat exchanging in order to lower the temperature of the cooling air having become hot, and such outer fan may be arranged also in the present embodiment although the outer fan is not illustrated.

As described above, the fan used for the motor 100 described in the present embodiment is the inner fan 22 arranged inside the frame 1, the inner fan 22 is of a diagonal flow type, and the discharge direction of the inner fan 22 is the inward direction namely the rotor 3 side.

Thereby, the motor 100 including the inner fans 22 described in the present embodiment efficiently uses the pressure rising effect of the axial ducts 5 and the radial ducts 4 and the pressure rising effect of the inner fans 22, can increase the air volume of the cooling air and can enhance the cooling capacity even in the air passage having a large ventilation resistance. Also, the motor 100 including the inner fans 22 described in the present embodiment can improve the cooling capacity without increasing the size of the inner fans 22 and without increasing the noise.

Thus, according to the present embodiment, because the inner fans 22 for cooling and the sleeves 21 having a proper shape are provided in order to improve the cooling capacity, interference of the inner fans 22 and peripheral structures can be suppressed.

Next, explanation will be made on motions.

With respect to the motor 100 described in the present embodiment, by energizing the stator wiring 12, the rotor 3, the shaft 2, the sleeves 21, and the inner fans 22 rotate. Thereby, heat is generated in the rotor 3 and the stator 11.

On the other hand, pressure of the air is raised in the inner fans 22 and the radial ducts 4, and cooling air is generated by the rotation.

The flow direction 31 of the cooling air is from the outside to the inside of the inner fan 22 namely the direction toward the rotor 3 and the stator 11. The cooling air discharged from the outlet of the inner fan 22 flows so as to be branched into the direction of mainly passing through the gaps of the stator wiring 12 on the outside diameter side and the direction of passing through the axial ducts 5. The reason is that the turning surface 40 formed in the sleeve 21 acts.

The cooling air having passed through the axial ducts 5 passes through the radial ducts 4, and flows in to the cooler box 14 from the center part. In a similar manner, the cooling air having passed through the gaps of the stator wiring 12 also flows in to the cooler box 14 from the center part. The cooling air having been discharged from the outlet of the inner fan 22 absorbs heat generated in the rotor 3 and the stator 11 and the temperature rises until flowing-in to the cooler box 14.

The cooling air whose temperature has risen as described above exchanges heat with cold air that flows through cooling pipes arranged inside the cooler box 14 (radiates heat to the cold air), and the temperature drops. The cooling air whose temperature has dropped flows downward from the end of the cooler box 14, and is sucked again from the inlet of the inner fan 22. Then, the cooling air is circulated between the lower part of the frame 1 and the cooler box 14.

In the motor 100 including the inner fans 22 described in the present embodiment, because the discharging direction of the inner fan 22 and the suction direction of the axial duct 5 are same, the temperature rising effect of the both can be used efficiently. Also, because the inner fan 22 is of a diagonal flow type, cooling air of a large air volume can be generated without enlarging the outside diameter even in an air passage whose ventilation resistance is comparatively high.

Thus, even when the ventilation resistance becomes high as a case where the output of the motor 100 is raised and a case where constituent components are densely installed (densification), temperature rise of the rotor 3 and the stator 11 can be suppressed while achieving compactization and noise reduction of the motor 100.

Also, with respect to the sleeve 21, because the end of the outer peripheral surface on the downstream side of the inner fan 22 is formed so as to smoothly turn to the inside diameter direction (the turning surface 40 is formed), a part of the flow of the cooling air discharged toward the diagonal outside diameter direction can be turned toward the inside diameter direction at the outlet of the inner fan 22 of the diagonal flow type, flowing-in of the cooling air to the axial ducts 5 of the rotor 3 can be promoted, and the air volume of the cooling air can be increased. Therefore, temperature rise of the rotor 3 can be suppressed.

Further, in the present embodiment, the shape of the turning surface 40 formed at the end of the outer peripheral surface on the downstream side of the inner fan 22 of the sleeve 21 has a curved surface, however the shape may be combination of flat surfaces.

According to the present embodiment, even when the output of the motor 100 is to be improved (the output is to be increased), the improvement can be achieved without enlarging the fan (while keeping compactization (a same size)). That is to say, the cooling efficiency can be improved (the cooling air can be used efficiently) without enlarging the fan. Also, because it is not required to enlarge the fan, increase of the wind noise caused by enlargement of the fan can be suppressed also, and noise reduction can also be achieved.

Thus, noise reduction is allowed by reducing the outside diameter of the inner fan 22, and cooling capacity can be increased by increasing the air volume of the cooling air.

Also, with respect to the motor 100 described in the present embodiment, it is preferable that a distance 32 in the axial direction (rotation axis direction) between the blade root side rear edge of the inner fan 22 and the end ring 6 is set to 0.17 times or more and 0.20 times or less of a blade maximum outside diameter 41 of the inner fan 22. To be more specific, with respect to the motor 100 described in the present embodiment, the distance 32 in the axial direction between the blade root side rear edge of the inner fan 22 and the end ring 6 is set to 0.18 times of the blade maximum outside diameter 41 of the inner fan 22.

With respect to the motor 100 described in the present embodiment, the distance 32 in the axial direction between the blade root side rear edge of the inner fan 22 and the end ring 6 can be set small, the shaft length is shortened, and vibration can be reduced. Also, it is preferable to set the distance between the inner fan 22 and a discharged side obstacle to 0.20 times or more of the blade maximum outside diameter 41 of the inner fan 22 in the flow direction in order to avoid interference, and when the distance 32 in the axial direction between the blade root side rear edge of the inner fan 22 and the end ring 6 is set to 0.20 times of the blade maximum outside diameter 41 of the inner fan 22, reduction of the air volume of the cooling air discharged from the inner fan 22 can be suppressed. Further, in order to suppress reduction of the air volume of the cooling air discharged from the inner fan 22, it is preferable that the inclination angle of the inner fan 22 that is of the diagonal flow type is 30° or more in order to exert the difference against the axial flow type. In consideration of such inclination angle of the inner fan 22, it is preferable that the distance 32 in the axial direction between the blade root side rear edge of the inner fan 22 and the end ring 6 is made 0.17 times or more (0.20×cos 30°=0.17) of the blade maximum outside diameter 41 of the inner fan 22. That is to say, it is preferable that the distance 32 in the axial direction between the blade root side rear edge of the inner fan 22 and the end ring 6 is made 0.17 times or more and 0.20 times or less of the blade maximum outside diameter 41 of the inner fan 22.

By setting the distance 32 in the axial direction between the inner fan 22 and the end ring 6 thus, interference of the discharge flow of the inner fan 22 (cooling air flow) and the end ring 6 is suppressed, and reduction of the air volume of the cooling air can be avoided. As a result, temperature rise of the rotor 3 and the stator 11 can be suppressed.

Figure 2:
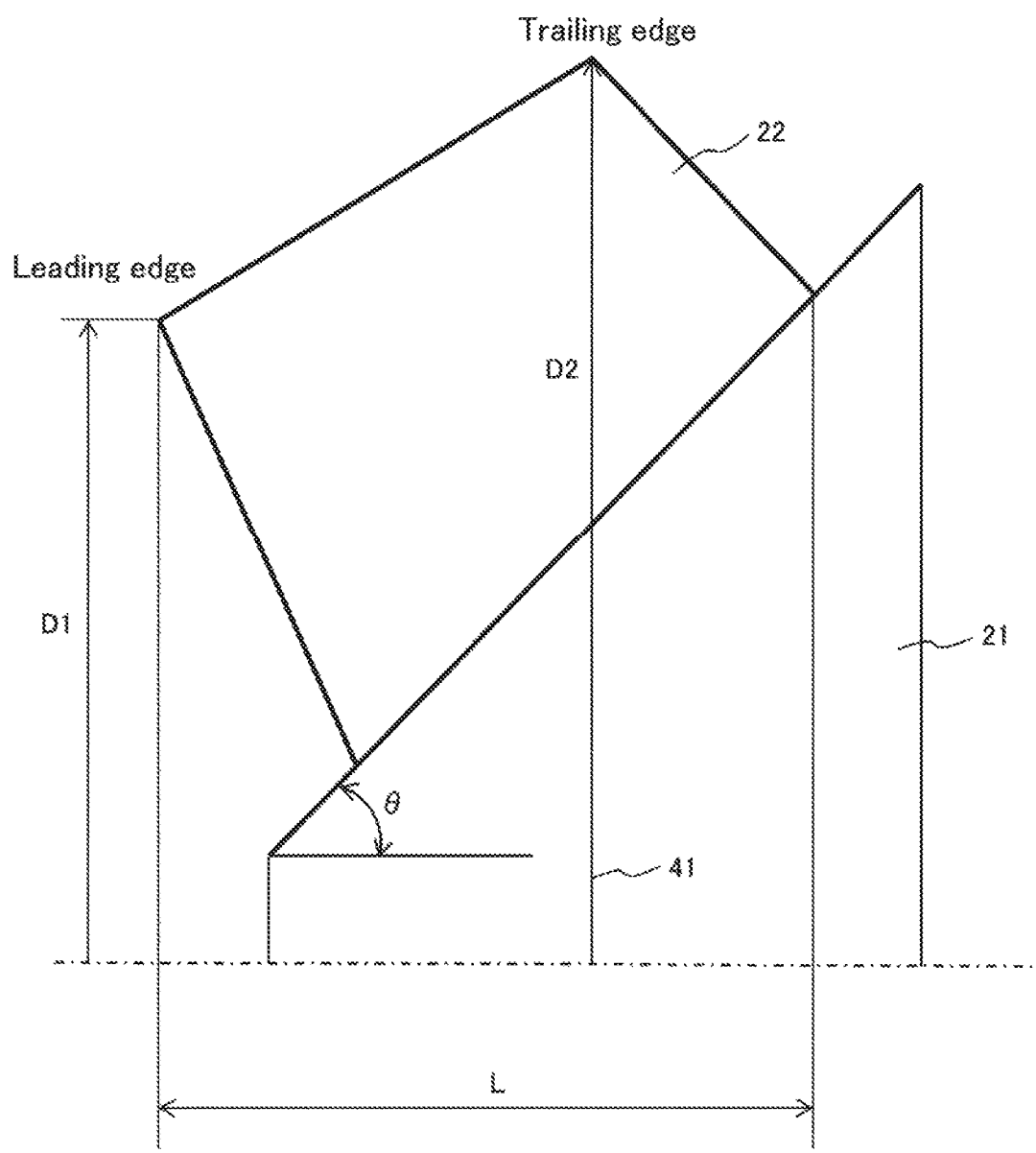
FIG. 2 is an explanatory drawing that explains the dimensional definition of an inner fan related to the present embodiment by a meridian plane.

FIG. 2 is an explanatory drawing that explains the dimensional definition of an inner fan related to the present embodiment by a meridian plane.

With respect to the inner fan 22 described in the present embodiment, it is preferable that the meridian plane shape of the blade is formed totally by straight lines without using a curved line as shown in FIG. 2. By employing such shape, the shape of the blade becomes comparatively simple, and therefore manufacturing and assembling become easy.

Also, it becomes possible to manage the gap amount of the inner fan 22 and the fan guide 23 to a smaller value, and the performance of the inner fan 22 can be improved. Thereby, the cooling capacity can be increased. As a result, temperature rise of the rotor 3 and the stator 11 can be suppressed.

Also, it is preferable that the total length (L) in the axial direction (rotation axis direction) of the blade of the inner fan 22 is made 0.17 times or less (0.15 times or more) of the blade maximum outside diameter 41 (outlet outside diameter: D2).

In the present embodiment, as shown in FIG. 2, in the meridian plane of the blade, the meridian plane shape of the blade of the inner fan 22 is formed totally by straight lines. Also, the total length (L) in the axial direction of the blade is made 0.16 times of the blade maximum outside diameter 41 (outlet outside diameter: D2).

By employing such shape, the distance between two bearings can be set to a proper distance without being made too large while keeping the distance between the inner fan 22 and the end ring 6 to a proper distance, therefore vibration of the shaft can be stabilized, interference of the discharge flow of the inner fan 22 (cooling air flow) and the end ring 6 is suppressed, and reduction of the air volume of the cooling air can be avoided. As a result, temperature rise of the rotor 3 and the stator 11 can be suppressed.

Also, it is preferable that a front edge outside diameter D1 of the blade of the inner fan 22 is set to 0.87 times or more (0.89 times or less) of the blade maximum outside diameter D2, and that the inclination angle $\theta$ between the outer peripheral part of the sleeve 21 and the axis of the shaft 2 is made 45° or more (50° or less).

In the present embodiment, the front edge outside diameter D1 of the blade of the inner fan 22 is made 0.88 times of the blade maximum outside diameter D2. Also, the inclination angle $\theta$ between the outer peripheral part of the sleeve 21 and the axis of the shaft 2 is made approximately 45°.

By employing such shape, the front edge outside diameter D1 of the blade of the inner fan 22 can be set properly, the inclination angle $\theta$ between the outer peripheral part of the sleeve 21 and the axis of the shaft 2 also can be set properly, and therefore the static pressure efficiency of the inner fan 22 can be improved while suppressing separation of the inter-blade flow. As a result, temperature rise of the rotor 3 and the stator 11 can be suppressed.

Figure 3:
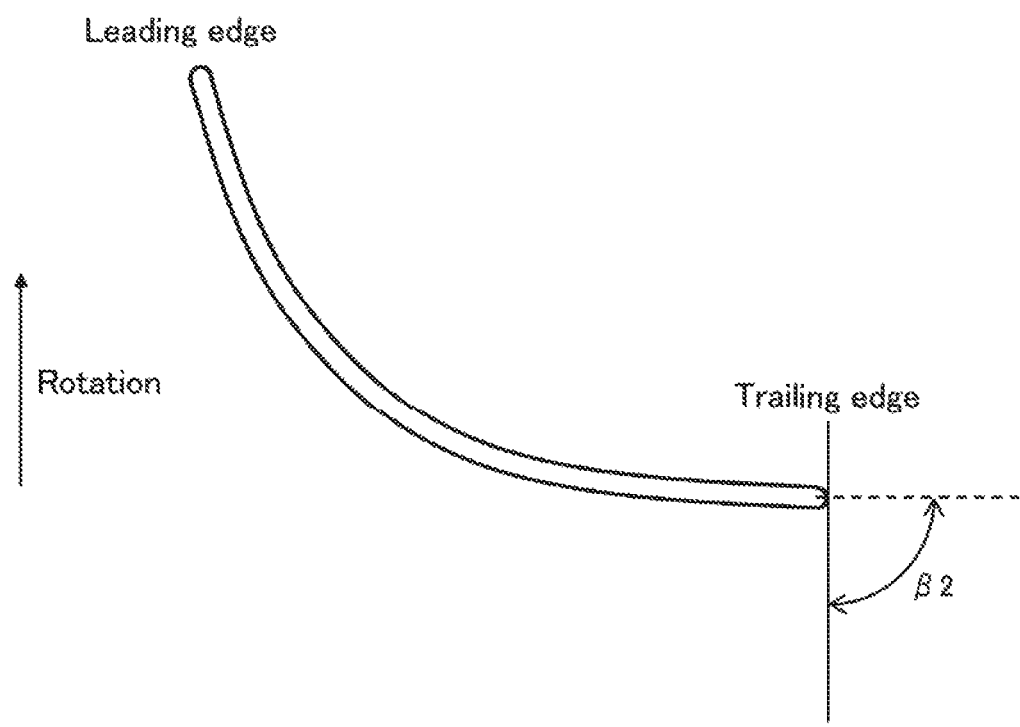
FIG. 3 is an explanatory drawing that explains the dimensional definition of the inner fan related to the present embodiment by a blade type.

FIG. 3 is an explanatory drawing that explains the dimensional definition of the inner fan related to the present embodiment by a blade type.

As shown in FIG. 3, the outlet angle $\beta 2$ of the blade root of the inner fan 22 is set to approximately 90°. Also, it is preferable that the outlet angle $\beta 2$ of the blade root of the inner fan 22 is 85° or more and 90° or less. By employing such shape, the outlet angle $\beta 2$ (not illustrated) of the blade tip end of the inner fan 22 can be made a proper angle, and the discharge pressure (pressure is raised) of the inner fan 22 can be made a high pressure while suppressing the harmful effect of a gap leakage flow and a separated flow at the blade tip end. Thereby, the cooling capacity can be increased.

As described above, by enlarging the outlet angle 32 of the blade root of the inner fan 22, reduction of the air volume of the cooling air discharged from the inner fan 22 can be suppressed. Therefore, temperature rise of the rotor 3 and the stator 11 can be suppressed.

With such shape, by reducing the speed at the inlet, the inlet loss can be reduced, and the speed can be increased between the blades. Also, separation of the flow between the blades is suppressed, a large centrifugal force can be converted to pressure, the static pressure efficiency of the inner fan 22 can be improved, and the cooling capacity can be increased.

Second Embodiment

Figure 4:
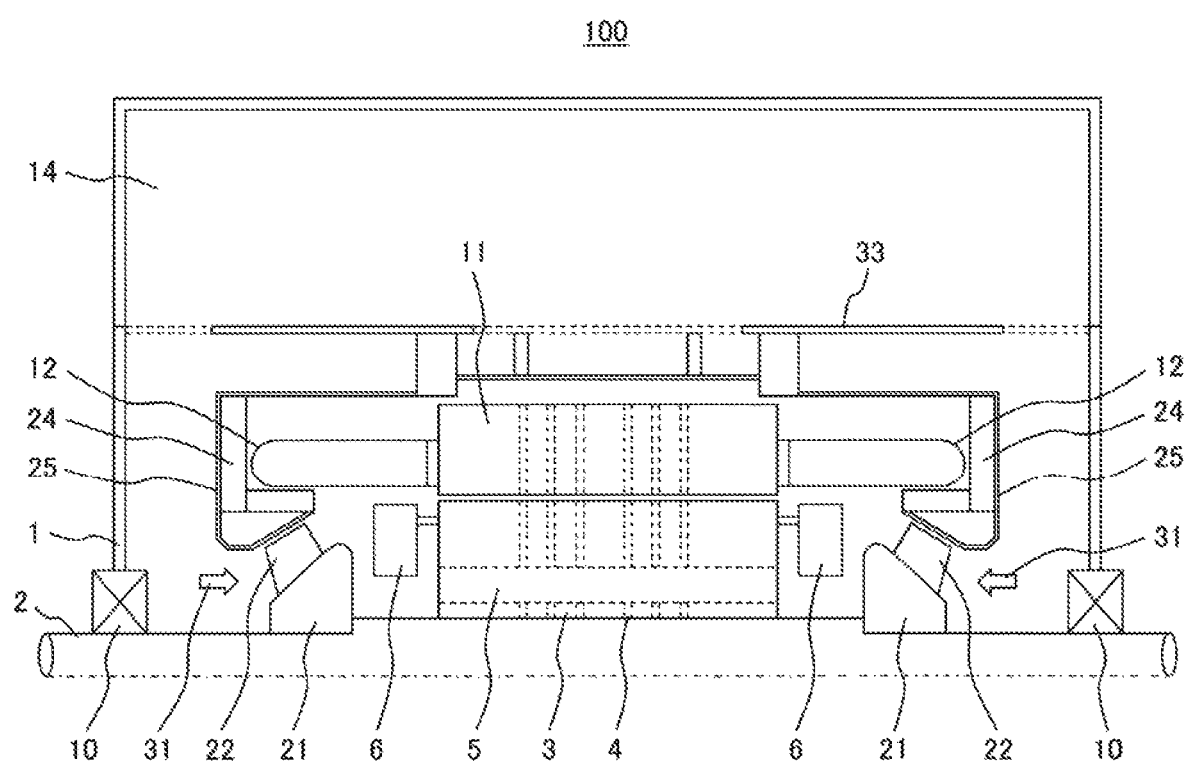
FIG. 4 is a schematic view that shows a cross section of an essential part of a motor with an inner fan related to another embodiment.

FIG. 4 is a schematic view that shows a cross section of an essential part of a motor with an inner fan related to another embodiment.

The motor 100 described in the present embodiment (FIG. 4) is generally similar to the motor 100 described in the first embodiment (FIG. 1). The difference with the motor 100 described in the first embodiment is that the fan guide 23 described in the first embodiment has a double structure of an inside diameter side fan guide 24 and an outside diameter side fan guide 25 in the present embodiment.

Also, because the reference signs described in FIG. 4 are similar to the reference signs described in FIG. 1, explanation thereof will be omitted.

By narrowing the gap between the inner fan 22 and the outside diameter side fan guide 25, the leaked flow at the blade tip end part of the inner fan 22 (at the gap between the inner fan 22 and the outside diameter side fan guide 25) can be suppressed, and the performance of the inner fan 22 can be improved.

At the same time, by narrowing the gap between the stator wiring 12 and the inside diameter side fan guide 24, the leaked flow and the vortex at the gap between the stator wiring 12 and the inside diameter side fan guide 24 can be suppressed, and a loss in the air passage in the vicinity of the stator wiring 12 can be reduced.

Thereby, temperature rise of the rotor 3 and the stator 11 can be suppressed.

Also, it is preferable that the material of the outside diameter side fan guide 25 is iron material. Further, the material of the inside diameter side fan guide 24 may be non-iron material such as a resin.

That is to say, with respect to the motor 100 described in the present embodiment, it is preferable that the fan guide 23 described in the first embodiment is made to have a double structure, the outside diameter side (the outside diameter side fan guide 25) is arranged along the tip end of the blade outer periphery of the inner fan 22, and the inside diameter side (the inside diameter side fan guide 24) is arranged along the outside diameter side contour of the stator wiring 12.

With such configuration, while narrowing the gap between the inner fan 22 and the outside diameter side fan guide 25, the gap between the stator wiring 12 and the inside diameter side fan guide 24 can also be narrowed, the leaked flow and the vortex can be suppressed, a loss in the air passage can be reduced, and the cooling capacity can be increased with a simple configuration.

Also, the present invention is not limited to the embodiments described above, and includes various modifications. For example, the embodiments described above have been explained in detail for easy understanding of the present invention, and the present invention is not necessarily limited to those including all configurations having been explained.

Further, the motor described in the embodiments described above can be applied to an induction motor and a permanent magnet synchronous motor.

REFERENCE SIGNS LIST

1: Frame
2: Shaft
3: Rotor
4: Radial duct
5: Axial duct
6: End ring
10: Bearing
11: Stator
12: Stator wiring
14: Cooler box
21: Sleeve
22: Inner fan
23: Fan guide
31: Flow direction of cooling air
33: Ceiling plate

What is claimed is:

1. A motor with an inner fan, comprising:
a rotor that rotates with a shaft;
a stator that opposes the outer peripheral surface of the rotor;
an end ring that is connected to the rotor;
stator wiring that is connected to the stator;
a fan that rotates with the shaft through a sleeve;
a fan guide that opposes a tip end of a blade outer periphery of the fan; and
a frame that stores the rotor, the stator, the fan, the fan guide, the end ring, and the stator wiring,
wherein the rotor includes an axial duct and a radial duct, the axial duct penetrating the rotor in the axial direction of the rotor, the radial duct communicating with the axial duct and penetrating the rotor radially from the inside to the outside of the rotor,
the fan is an inner fan that is arranged inside the frame, and the tip end of the blade outer periphery of the fan is exposed,
the inner fan is of a diagonal flow type, and
a discharge direction of the inner fan is an inward direction,
wherein the fan guide is of a double structure,
an outside diameter side of the fan guide is arranged along a tip end part of a blade outer periphery of the inner fan, and
an inside diameter side of the fan guide is arranged along an outside diameter side contour of the stator wiring.

2. The motor according to claim 1, wherein a turning surface that turns to the inside diameter direction is provided at an end of an outer peripheral surface of the sleeve, the outer peripheral surface being on the downstream side of the inner fan.

3. A motor with an inner fan, comprising:
a rotor that rotates with a shaft;
a stator that opposes the outer peripheral surface of the rotor;
an end ring that is connected to the rotor;
stator wiring that is connected to the stator;
a fan that rotates with the shaft through a sleeve;
a fan guide that opposes the tip end of the blade outer periphery of the fan; and
a frame that stores the rotor, the stator, the fan, the fan guide, the end ring, and the stator wiring,
wherein the rotor includes an axial duct and a radial duct, the axial duct penetrating the rotor in the axial direction of the rotor, the radial duct communicating with the axial duct and penetrating the rotor radially from the inside to the outside of the rotor,
the fan is an inner fan that is arranged inside the frame,
the inner fan is of a diagonal flow type, and
the discharge direction of the inner fan is the inward direction,
wherein a distance in the axial direction between a blade root side rear edge of the inner fan and the end ring is set to 0.17 times or more and 0.20 times or less of a blade maximum outside diameter of the inner fan.

4. The motor according to claim 1, wherein a meridian plane shape of blades of the inner fan is formed by straight lines.

5. The motor according to claim 1, wherein an outlet angle of a blade root of the inner fan is 85° or more and 90° or less.

* * * * *